United States Patent
Mannix

(10) Patent No.: US 11,263,694 B2
(45) Date of Patent: *Mar. 1, 2022

(54) SYSTEM, METHOD, AND COMPUTER-READABLE MEDIUM FOR IMPROVING THE EFFICIENCY AND STABILITY OF FINANCIAL MARKETS

(71) Applicant: Tamer Trading Technologies LLC, Gainesville, VA (US)

(72) Inventor: Brian F. Mannix, Gainesville, VA (US)

(73) Assignee: TAMER TRADING TECHNOLOGIES LLC, Gainesville, VA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/152,952

(22) Filed: Oct. 5, 2018

(65) Prior Publication Data

US 2019/0087898 A1    Mar. 21, 2019

Related U.S. Application Data

(63) Continuation of application No. 13/828,398, filed on Mar. 14, 2013, now Pat. No. 10,127,612.

(Continued)

(51) Int. Cl.
*G06Q 40/04* (2012.01)
*H04L 43/0852* (2022.01)
*G06Q 40/00* (2012.01)

(52) U.S. Cl.
CPC ............. *G06Q 40/04* (2013.01); *G06Q 40/00* (2013.01); *H04L 43/0852* (2013.01)

(58) Field of Classification Search
CPC ..... G06Q 40/04; G06Q 40/00; H04L 43/0852
See application file for complete search history.

(56) References Cited

U.S. PATENT DOCUMENTS 5,771,241 A * 6/1998 Brummel ......... G01R 31/31813
714/733
6,618,707 B1 * 9/2003 Gary ..................... G06Q 40/00
705/36 R (Continued)

FOREIGN PATENT DOCUMENTS

WO    WO-9723114 A1 *  6/1997    ......... H04Q 11/0478
WO    97/23411 A1    7/1997

(Continued)

OTHER PUBLICATIONS

Mannix, Brian F.: Race, Rushes, and Runs: Taming the Turbulance in Financial Trading, Oct. 23, 2012, SEC Releade No. 34-67802, SEC File No. 4-652, Regulatory Studies Center, The George Washington University, Washington D.C., pp. 1-19. (Year: 2012).*

(Continued)

*Primary Examiner* — Bijendra K Shrestha
(74) *Attorney, Agent, or Firm* — Baker Botts L.L.P.; Michael A. Sartori

(57) ABSTRACT

A method to assist in the operation of a financial market. The method including receiving one or more transaction messages, where the one or more transaction messages include one or more orders or order commitments to be executed on the financial market; imposing one or more delays on the one or more orders or order commitments using a delay algorithm; processing the one or more order or order commitments by opening the one or more transaction messages after the one or more delays; matching the opened orders or order commitments; and executing the matched orders or order commitments.

20 Claims, 3 Drawing Sheets

Related U.S. Application Data

(60) Provisional application No. 61/641,990, filed on May 3, 2012, provisional application No. 61/717,492, filed on Oct. 23, 2012.

(56) References Cited

U.S. PATENT DOCUMENTS

| | | | | |
|---|---|---|---|---|
| 7,840,482 | B2* | 11/2010 | Singla | G06Q 40/04 |
| | | | | 705/37 |
| 7,921,054 | B2 | 4/2011 | Balabon | |
| 7,962,401 | B2* | 6/2011 | Bertilsson | G06Q 40/04 |
| | | | | 705/37 |
| 8,112,347 | B2 | 2/2012 | Farrell et al. | |
| 8,165,954 | B2 | 4/2012 | Waelbroeck et al. | |
| 8,266,037 | B2 | 9/2012 | Farrell et al. | |
| 8,774,407 | B2* | 7/2014 | Eklund | G06F 21/51 |
| | | | | 380/255 |
| 2001/0043575 | A1* | 11/2001 | Kelly | H04B 7/18578 |
| | | | | 370/321 |
| 2003/0231741 | A1* | 12/2003 | Rancu | H04W 24/06 |
| | | | | 379/9 |
| 2004/0059666 | A1* | 3/2004 | Waelbroeck | G06Q 40/04 |
| | | | | 705/37 |
| 2005/0075963 | A1* | 4/2005 | Balabon | G06Q 40/06 |
| | | | | 705/36 R |
| 2005/0097365 | A1* | 5/2005 | Alldredge | G06Q 20/3823 |
| | | | | 726/4 |
| 2005/0234805 | A1* | 10/2005 | Robertson | G06Q 40/04 |
| | | | | 705/37 |
| 2007/0022040 | A1* | 1/2007 | Gordon | G06Q 30/08 |
| | | | | 705/37 |
| 2009/0089199 | A1* | 4/2009 | Waelbroeck | G06Q 10/0637 |
| | | | | 705/37 |
| 2009/0099952 | A1 | 4/2009 | Wahlberg | |
| 2010/0145874 | A1 | 6/2010 | Janowski | |
| 2010/0332367 | A1 | 12/2010 | Foygel et al. | |
| 2011/0145125 | A1 | 6/2011 | Foygel et al. | |
| 2012/0271753 | A1 | 10/2012 | Adatia | |
| 2012/0296796 | A1 | 11/2012 | Smith | |
| 2012/0323757 | A1 | 12/2012 | Monroe | |
| 2012/0328065 | A1* | 12/2012 | Burg | H03L 7/113 |
| | | | | 375/376 |
| 2015/0073967 | A1 | 3/2015 | Katsuyama et al. | |
| 2015/0073970 | A1 | 3/2015 | Merold et al. | |
| 2015/0127519 | A1 | 5/2015 | Melton | |
| 2016/0104242 | A1 | 4/2016 | Melton | |

FOREIGN PATENT DOCUMENTS

| | | | | |
|---|---|---|---|---|
| WO | 2010/085746 | A1 | 7/2010 | |
| WO | WO-2010/085746 | * | 7/2010 | G06Q 40/00 |
| WO | WO-2010085746 | A1* | 7/2010 | G06Q 40/06 |
| WO | 2016/071714 | A1 | 5/2016 | |

OTHER PUBLICATIONS

Gai et al.: The Externalities of High-Frequency Trading, Mar. 15, 2012, University of Illinois at Urbana-Champaign, Champaign, IL, pp. 1-48. (Year: 2012).*
Lasair Capital LLC: The Impact of High Frequency Trading on Asset Managers, Feb. 2012, pp. 1-5. (Year: 2012).*
Australian Security Exchange (ASX): Algorithmic Trading and Market Access Arrangements, Feb. 8, 2010, pp. 1-55. (Year: 2010).*
Efficient-market hypothesis, Wikipedia, updated Mar. 11, 2013, available at http://en.wikipedia.org/w/index.php?title=Efficient-market_hypothesis&oldid=543381000 [Cited in Parent].
Akerlof, "The Market for "Lemons": Quality Uncertainty and the Market Mechanism," The Quarterly Journal of Economics, 84(3), 1970, pp. 488-500 [Cited in Parent].
Angel et al., "Equity Trading in the 21st Century," USC Marshall School of Business: Marshall Research Paper Series Working Paper FBE 09-10, USC Marshall, May 18, 2010, pp. 1-54. [Cited in Parent].
Angel et al., Equity Trading in the 21st Century: An Update, Jun. 21, 2013, pp. 1-41. [Cited in Parent].
Authority of Financial Market (AFM): High Frequency Trading: The application of advanced trading technology in European Marketplace, Amsterdam, Nov. 2010, pp. 1-56 (Year: 2010) [Cited in Parent].
Holly A. Bell, "Regulator, Go Slow on Reining in High-Speed Trading," Opinion, The Wall Street Journal, Feb. 7, 2013, available at http://online.wsj.com/article/SB10001424127887324445904578286524225644936.html, <last accessed on Mar. 4, 2003>. [Cited in Parent].
Bhagwati, "Directly Unproductive, Profit-seeking (DUP) Activities," Journal of Political Economy, 90(5), 1982, pp. 988-1002 [Cited in Parent].
Clark et al., FX Week, "Consensus lacking on optimal length for randomised pause," Jun. 3, 2013, available at http://www.fxweek.com/fx-week/analysis/2271944/consensus-lacking-on-optimal-length-for-randomised-pause [Cited in Parent].
Fama, "Efficient Capital Markets: A Review of Theory and Empirical Work," The Journal of Finance, 25(2), Papers and Proceedings of the Twenth-Eighth Annual Meeting of the American Finance Association of New York, NY, 1969, pp. 383-417 [Cited in Parent].
Harris, John, "Michael Lewis Should Have Asked Brian Reid About IEX's Coiled Cables," The Great HFT Debate, FabbFORUM, Apr. 15, 2014, pp. 1-2, available at: http://tabbforum.com/opinions/michael-lewis-should-have-asked-brian-reid-about-iex's-coiled-cables. [Cited in Parent].
Harris, Larry, "Stop the high-frequency trader arms race," Financial Times, Dec. 27, 2012, pp. 1-2, available at http://www.ft.com/cms/s/0/618c60de-4b80-11e2-88b5-00144feab49a.html [Cited in Parent].
Holley E., "Tradition FX platform cuts out HFT 'predators'," Banking Technology, May 30, 2013, available at http://www.bankingtech.com/64201/tradition-fx-platform-cuts-out-hft-%e2%80%98predators%e2%80%99/, <last accessed on Jun. 10, 2013. [Cited in Parent].
Kovaleva et al., "Optimal Trading Strategies in a Limit Order Marked with Imperfect Liquidity", Preprint submitted to Elsevier, May 15, 2012, pp. 1-27 [Cited in Parent].
Krueger, "The Political Economy of the Rent-Seeking Society," The American Economic Review, 64(3), 1974, pp. 291-303 [Cited in Parent].
Lewis, Michael, "Flash Boys : A Wall Street Revolt," W.W. Norton & Company, New York, 2014, p. 174. [Cited in Parent].
Mannix, "Finding—and Fixing—Flaws in Financial Market Microstructure," Draft Submission to GMU's Journal of Law, Economics & Policy, Jan. 20, 2016. [Cited in Parent}.
Mannix, "Finding—and Fixing—Flaws in Financial Market Mircostructure," Submission to U.S. Securities and Exchange Commission, Comments on Investors' Exchange LLC, Notice of Filing of Application, as Amended, for Registration as a National Securities Exchange under Section 6 of the Securities Exchange Act of 1934, Release No. 34-75925, File No. 10-222, Jun. 17, 2016 [Cited in Parent].
Mannix, Brian F.: Races, Rushes, and Runs: Taming the Turbulence in Financial Trading, Oct. 2012, Working Paper, Regulatory Studies Center, The George Washingtin University, Washington D.C., pp. 1-20. [Cited in Parent].
Mannix, Brian, "A Flash Judgment," Regulatory Studies Center, The George Washington University, Apr. 14, 2014, pp. 1-2. [Cited in Parent].
Mannix, Brian, "A Day at the Races: Why HFT Is Inefficient," The Great HFT Debate, Tabb FORUM, May 7, 2014, pp. 1-15. [Cited in Parent].
Mannix, Brian, "Game of Thumbs: Eliminating the Excesses of HFT Racing," The Great HFT Debate, Tabb FORUM, May 13, 2014, pp. 1-8. [Cited in Parent].
Marcus, Daniel, "HFT Is Damaging the Reputation of the Markets," The Great HFT Debate, Tabb FORUM, May 9, 2014, pp. 1-3. [Cited in Parent].

(56) References Cited

OTHER PUBLICATIONS

Osipovich "Steve Cohen Targets High-Frequency Trading with 'Dark Pool' Venture," The Wall Street Journal, Dow Jones, Published on Apr. 17, 2018, Accessed from the Internet on Apr. 19, 2018, 3 pages [Cited in Parent].
ParFX Pure By Design, "ParFX proves the value of its 'randomisation' design," May 24, 2013, available at http://www.parfx.com/news/parfx-proves-value-its-%E2%80%98randomisation%E2%80%99-design, <last accessed Jun. 10, 2013. [Cited in Parent].
Sadogi et al.: Efficient Event Processing through Reconfigurable Hardware for Algorithmic Trading, 2010, Proceedings of the VLDB Endowment, vol. 3, No. 2, pp. 1-4. (Year: 2010) [Cited in Parent].
Securities and Exchange Commission, "Investors' Exchange, LLC; Notice of Filing of Application, as Amended, for Registration as a National Securities Exchange under Section 6 of the Securities Exchange Act of 1934," Release No. 34-75925; File No. 10-222, Sep. 15, 2015. [Cited in Parent].
Siers, FX Week, "FX platforms divided on management of costs and speed," Oct. 18, 2013, available at http://www.fxweek.com/print_article/fx-week/news/2301400/fx-platforms-divided-on-management-of-costs-and-speed. [Cited in Parent].
Szaley, FX Week, "Thomson Reuters 'considering' randomisation on Matching platform," Dec. 11, 2013, available at http://www.fxweek.com/fx-week/news/2318524/thomson-reuters-considering-randomisation-on-matching-platform. [Cited in Parent].
Tullock, "The Welfare Costs of Tariffs, Monopolies and Theft," Western Economic Journal, 5(3), 1967, pp. 224-232 [Cited in Parent].
B. Mannix, "Public Interest Comment on The Commodity Futures Trading Commission's Concept Release on Risk Controls and System Safeguards for Automated Trading," Commodity Futures Trading Commission, Comment for Orders and Other Announcements 78 FR 56542, Comment No. 59439, Dec. 10, 2013 [online] [retrieved on Oct. 28, 2020]. Retrieved from Internet <URL:https://comments.cftc.gov/PublicComments/ViewComment.aspx?id=59439&SearchText=mannix>.
B. Mannix, "Public Interest Comment on The Security and Exchange Commission's Market Technology Roundtable," SEC Release No. 34-67802, SEC File No. 4-652, Oct. 23, 2012 [online] [retrieved on Oct. 28, 2020], Retrieved from Internet <URL: https://www.sec.gov/comments/4-652/4652-37.pdf>.
Commodity Futures Trading Commission, "Summary of Meeting in Connection with Concept Release on Risk Controls and System Safeguards for Automated Trading Environments," Commodity Futures Trading Commission, Comment for Orders and Other Announcements 78 FR 56542, Ex Parte Communication, Meeting with Brian F. Mannix, Comment No. 59518, Jan. 30, 2014 [online] [retrieved on Oct. 28, 2020]. Retrieved from Internet <URL:https://comments.cftc.gov/PublicComments/ViewComment.aspx?id=59518&SearchText=>.

\* cited by examiner

SYSTEM, METHOD, AND COMPUTER-READABLE MEDIUM FOR IMPROVING THE EFFICIENCY AND STABILITY OF FINANCIAL MARKETS

CROSS-REFERENCE TO RELATED APPLICATIONS

This application is a Continuation of U.S. patent application Ser. No. 13/828,398, filed Mar. 14, 2013, which claims the benefit of U.S. Provisional Patent Application No. 61/641,990, filed May 3, 2012 and U.S. Provisional Patent Application No. 61/717,492 filed Oct. 23, 2012, the contents of each of which are hereby incorporated by reference in their entirety.

BACKGROUND

Field of Invention

Embodiments of the invention relate generally to assisting in the operations of financial markets, and more particularly to a system, method, and computer-readable medium for improving the efficiency and stability of financial markets.

SUMMARY

Aspects of the invention involve systems, methods, and computer readable medium. In one embodiment, a computer-implemented method may be provided to assist in the operation of a financial market. The method may comprise receiving one or more transaction messages by a computer system, wherein the one or more transaction messages include one or more orders or order commitments to be executed on the financial market; imposing one or more delays on the one or more orders or order commitments by the computer system using a delay algorithm; processing, by the computer system, the one or more order or order commitments by opening the one or more transaction messages after the one or more delays; matching, by the computer system, the opened orders or order commitments; and executing, by the computer system, the matched orders or order commitments.

In another embodiment a financial exchange system may be provided to assist in the operation of a financial market. The system may include a storage device comprising a temporal buffer; an input device configured to receive one or more orders or order commitments to buy or sell a financial instrument on the financial market; and a processor configured to: insert the one or more orders or order commitments into the temporal buffer, calculate a delay to be applied to one or more orders or order commitments based on positions of the one or more orders or order commitments within the temporal buffer, and expose one or more orders or order commitments to the financial market for execution after the associated delay.

In yet another embodiment, one or more tangible non-transitory computer-readable storage media may exist for storing computer-executable instructions executable by a computer system. The media may store one or more instructions for: receiving one or more orders or order commitments by the computer system, wherein the one or more orders or order commitments includes an instruction to buy or sell a financial instrument or commodity on a financial market; calculating a delay to be applied to the one or more orders or order commitments by the computer system using a delay algorithm; associating the delay with the one or more orders or order commitments by the computer system; and exposing the one or more orders or order commitments to the financial market for execution, by the computer system, after the associated delay.

BRIEF DESCRIPTION OF THE DRAWINGS

The foregoing and other features and advantages of the invention will be apparent from the following, more particular description of various exemplary embodiments, as illustrated in the accompanying drawings wherein like reference numbers generally indicate identical, functionally similar, and/or structurally similar elements. The first digits in the reference number generally indicates the drawing in which an element first appears.

DESCRIPTION OF THE EMBODIMENTS

Figure 1:
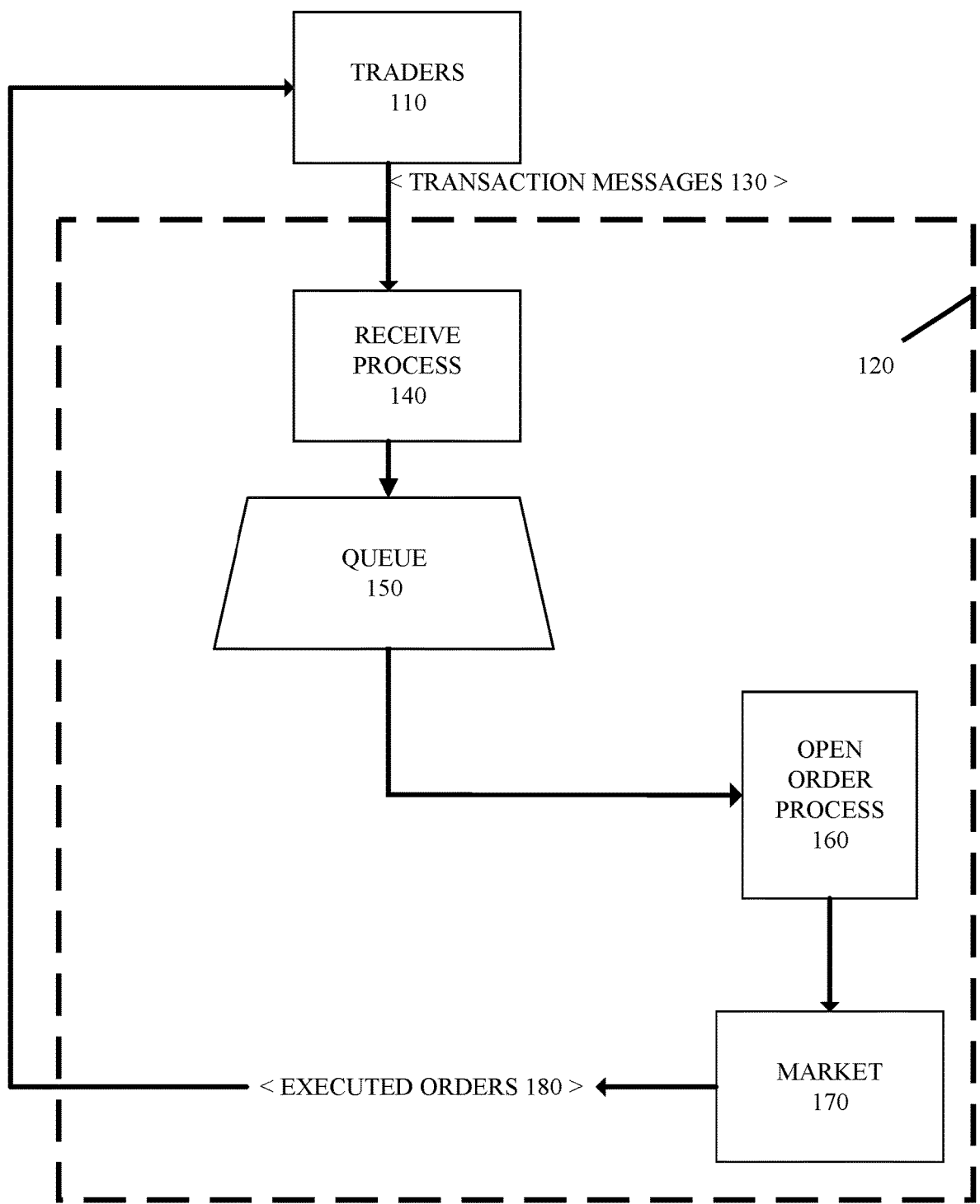
FIG. 1 depicts an depicts an example PoolQ system.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

All publications cited herein are hereby incorporated by reference in their entirety.

As used herein, the term "a" refers to one or more. The terms "including," "for example," "such as," "e.g.," "may be" and the like, are meant to include, but not be limited to, the listed examples. The term "product" may refer to both products and services.

Participants, regulators, and observers of commodity and security markets may be concerned that the explosive growth of high-frequency digital trading is somehow excessive, costly, unfair, and/or destabilizing. The digitization of the trading infrastructure, in combination with ubiquitous but fleeting information asymmetries, has stimulated a dramatic expansion of racing (e.g., the wasteful expenditure of resources in a contest to trade ahead of other market participants). Racing—like its cousin, queuing—is an example of a directly unproductive profit-seeking (DUP) activity whose costs erode the gains from trade that otherwise would be available to participants in the market. Racing may be reduced through the optional use of randomizing temporal buffers in the order flow. By slightly slowing the pace of trading, for example, such buffers may allow market-data dissemination processes to saturate (e.g., allow information asymmetries to dissipate) faster than order execution processes, so that price discovery and trading may operate more efficiently in an environment with more symmetrical information. By decoupling order flow from market-data flow, this may also reduce chaotic feedback instabilities that may affect automated trading markets.

Many analyses of financial markets appear to overlook the inefficiency of racing, in part due to a widespread misunderstanding of the efficient market hypothesis (EMH). Because the EMH emphasizes the speed with which information is incorporated into prices, many people tend to confuse speed with economic efficiency, thinking that faster must always be better. However, as the speed of trading approaches instantaneity, the cost will approach infinity.

It follows that the optimum speed of trading—the efficient speed, in the ordinary economic sense of efficiency—must be finite. Markets may be inefficient because the market is trading too slow or too fast. One embodiment of the invention addresses the "too fast" problem. This market imperfection has recently been severely aggravated by the digitization of trading systems, and the adverse effects may largely be mitigated by the voluntary use of temporally buffered trading systems in parallel with real-time trading systems.

One way or another, markets clear. Ideally, they clear at low cost by discovering a price acceptable to the buyer and the seller, with the price determining how the gains from trade will be divided between them. When, for whatever reason, the price mechanism is not functioning ideally, other mechanisms will assert themselves to close the gap between buyer and seller. Price controls on gasoline produced some spectacular queues in the United States in the 1970s. Economic regulation of airlines produced extra legroom, extra elbow room (i.e., empty seats), flying piano bars, and other forms of extravagant non price competition. Trade barriers have fostered bribery, even to the point of measurably degrading GDP in some nations; a vast literature on rent-seeking contains many more examples of Directly Unproductive Profit-seeking (DUP) activities that waste real economic resources even as they appear to be privately profitable. See, Gordon Tullock, "The Welfare Costs of Tariffs, Monopolies, and Theft," Western Economic Journal 5 (3) (1967): pp. 224-232; Anne O. Krueger, "The Political Economy of the Rent-Seeking Society" American Economic Review, 64 (1974): pp. 291-303; and Jagdish N. Bhagwati, *Directly Unproductive Profit-seeking (DUP) Activity*, JPE 1982 p. 988 vol 90 no. 51 U. Chic. Racing is one of those DUP activities, and is commonplace. We see racing in currency runs, in land and mineral rushes, in patent races, in fisheries with short and frantic seasons, and in a variety of situations where temporal priority is rewarded.

Both racing and queuing dissipate economic rents by wasting resources, but in racing the waste can be more difficult to spot. When people are waiting hours in line to buy gasoline, the real-resource losses are easily observed. When commuters arrive at work early just to get a parking space, losses are not immediately clear, but is nonetheless true, that mispriced parking is causing a net welfare loss. Racing may be mistaken for productive effort. In still other contexts, racing may be described as a "panic," but that label is misleading. Rational people will still trample each other to flee an inferno, or a collapsing currency.

Commercial fisheries provide some of the most instructive examples of racing. At the level of biologically and economically sustainable yields, the market price for fish is often much higher than the cost incurred in catching them. The difference represents an economic rent on the resource; but capturing that rent, without destroying that rent, is a challenge. In the absence of property rights in free-swimming fish, unrestricted competition will cause a fishery to collapse. Short fishing seasons is one common mechanism for preventing a collapse, but the response tends to be a more rapid expenditure of fishing effort—larger and faster boats, larger nets, etc. —in a race against the clock until a frantic equilibrium is achieved.

The overcapitalization of a fishery—excess investment in fast boats and other capital that may be used only a couple of weeks out of the year—is so obviously wasteful that fishery managers may impose "gear restrictions" and other regulatory impediments in an attempt to reduce the waste. But when one factor of production is constrained, extra effort is channeled into another factor; the race continues on whatever margin is available until the race is no longer worthwhile, the rents are exhausted and the market clears. Note that competition in the race-to-fish will drive profits to zero, but that emphatically does not mean that competition will drive costs to zero. The deadweight loss is real: the waste is not that someone is making a profit, but that no one is.

But if racing is wasteful, then racing should not exist in a ideally functioning market; there must be an underlying market failure that causes the misallocation of resources. Often that market failure is an absence of well-defined property rights, as in a common property resource. Indeed, the classical "tragedy of the commons" can be seen as an example of racing: the tragedy is not that there are too many sheep on the town commons, but that the sheep are turned out too early, eating the grass shoots before they have a chance to grow. Overgrazing and overfishing are both symptoms of the same underlying problem, and solving that problem is the key to avoiding the loss. The enclosure movement in Great Britain, and barbed wire in the U.S., solved overgrazing; Individual Tradable Quota (ITQ) management plans, by creating property-like shares in a fishery, are well on their way to solving overfishing.

Racing in financial markets bears a superficial resemblance to racing in fisheries. Indeed, the reported investments in high-speed data centers, fiber-optic linkages, and other accoutrements of high-frequency trading bear an uncanny resemblance to the overcapitalization that one sees in poorly regulated fisheries. They are costs incurred in the pursuit of profit; but, to the extent that they are unproductive, they erode the economic rents (i.e., the returns on investment) that would otherwise be available in the market. Here the remedy must be different, however, because the underlying market failure is different. The cause of racing in financial markets is an asymmetrical distribution of market-relevant information.

Information asymmetry is a well-understood market failure albeit one that, in the context of financial trading, has a history of some controversy. See, George Akerlof (1970), "The Market for Lemons: Quality Uncertainty and the Market Mechanism," Quarterly Journal of Economics (The MIT Press) 84 (3): 488-500. This arises, in part, from the tension between two views of information as an economic good. One view is that information asymmetries, whatever their origin, cause unfairness and inefficiency; much of our regulatory system is designed to ensure that public information is available to everyone at the same time. The other view is that those who trade on information are improving price discovery and thereby helping make the market more efficient; their profit is simply the reward they receive for the service they are providing. From this latter perspective, the majority of market participants appear to be free-riding on those few who make the needed investment to produce accurate information and, through trading, to share information.

Over several decades this argument has not been settled, most likely because there is merit in both points of view. Information is valuable, but once produced can be copied for free; and information cannot be characterized neatly as a pure public good nor as a pure private good. Our legal institutions that deal with the ownership of information (e.g., the patent system, copyright and fair-use doctrine, etc.) tend to strike a balance between these two extreme views of information as an economic good. Financial markets have their own complicated set of contractual and legal institutions for handling information.

In all of these fields, the digital revolution has upset the pre-existing balance between the private-good and public-good models of information and forced a reexamination of institutions that govern the use of information. Thus we should not be surprised that the digitization of trading has dramatically altered the way that information is processed and rewarded in financial markets.

The speed of automated trading certainly appears to be a good thing, in that it brings us closer to the ideal of a market that almost instantaneously reflects all of the available information. So how can we possibly reconcile the Efficient Market Hypothesis (EMH) with the claim made here that racing is a manifestation of inefficiency? See, Eugene F. Fama, "Efficient Capital Markets: A Review of Theory and Empirical Work," The Journal of Finance, Vol. 25, No. 2, May 1970, pp. 383-417. The simple answer is that these are two different uses of the same word.

The phrase "efficient market" as used in the EMH typically has a static meaning. The EMH states that markets quickly reach an equilibrium, but people forget that it is the equilibrium that is efficient—not necessarily the quickness of reaching the equilibrium. We tend to take it for granted that faster information incorporation always translates into superior resource allocation, and that the profits made by news traders therefore represent compensation earned for a productive activity. But it is not necessarily so. The speed at which a market's prices incorporate new information is, in part, the product of competition among traders to profit by trading early on breaking news. Real resources are expended in that competition; and, to the extent that they are devoted to unproductive racing, they represent a real loss.

The typical statement of the EMH glosses over this point, implicitly treating instantaneity as if it were an optimum. From Eugene Fama: "[W]e should note that what we have called the efficient markets model . . . is the hypothesis that security prices at any point in time 'fully reflect' all available information." [Emphasis in original.] From Wikipedia: "The semi-strong-form EMH claims both that prices reflect all publicly available information and that prices instantly change to reflect new public information." Wikipedia, "Efficient-market hypothesis," http://en.wikipedia.org/wiki/Efficient-market_hypothesis, accessed 5/7/12.

But, of course, prices do not "instantly change." To see where economic inefficiency may be hiding in an otherwise EMH-efficient market, consider an alternative informal paraphrasing of the hypothesis:

"If t is the last moment in which a particular bit of information has no trading value because no one knows it yet, and t+1 is the earliest moment in which it has no trading value because now everyone effectively knows it, then t and t+1 are very close together and getting closer all the time."

This restatement captures the essence of the EMH, for which there is extensive empirical confirmation in the literature, but this restatement also makes it clear that the EMH says nothing about what happens in between time t and t+1. However brief that interval may be, a great deal of trading may happen within the interval. And, because information during that interval is not symmetrically distributed and prices are not in equilibrium, trading during that interval should not be expected to be efficient in the usual economic sense, and empirical tests of the market's static efficiency should not be expected to be able to identify a dynamic inefficiency of the sort that racing represents.

The moments t and t+1 may be only microseconds apart, but by one important measure—the latency/jitter ratio—they are farther apart than ever. High-frequency trading thrives, and exacts its toll, within this ephemeral realm. Markets that are EMH-efficient may nonetheless bleed billions of dollars of value through the temporal interstices that are opened up by the digitization of trading.

The information asymmetries that drive this inefficiency arise because news does not break instantaneously. Those who learn news first may profit by placing orders to buy or sell securities, later unwinding their position after prices have adjusted. News traders may expend real resources in an attempt to surf the leading edge of any bit of breaking news. Noise traders—those whose have some exogenous reason to trade, rather than any particular news—will widen bid-ask spreads, withdraw temporarily from a turbulent market, or otherwise take defensive action in response to the heightened risk of being on the wrong end of a trade. This is the lemon effect: the classic description of a market impaired by information asymmetries.

At the very short time scales in which computer programmed high-frequency trading takes place, another complication arises. Some high-frequency trading programs may examine the flow of the trading data itself and trade on the news it contains—essentially racing the tape. This is feasible because the dissemination of market news and the processing of market orders use the same digital technology. Both processes have the same "relaxation time," and are therefore strongly coupled. The net effect can be destabilizing as trading programs attempt to outrun each other in the direction of any perceived trend, or else defensively withdraw causing liquidity to evaporate. The "flash crash" of May 6, 2010, did not appear to be a panic, nor (because the market so quickly rebounded) was the "flash crash" simply a rapid adjustment to a new equilibrium; the "flash crash" may in part have been a manifestation of market instability associated with high-frequency tape racing.

Of course, it remains true that a market could not function without news traders. But those who spend real resources to learn in a microsecond what everyone will know, for free, in a millisecond are not performing a service. Those resources are directed not at creating real value, but at redistributing value. The distinction, above, between trades that takes place at equilibrium prices and those that take place "between the ticks" is an artificial one; in reality there is a continuum that is not so easily parsed. Even so, at very short time scales, it can be inferred that the benefits of price discovery become vanishingly small while the risks of costly and destabilizing racing become large. For this reason trading strategies that depend upon very high speed are more likely to be associated with inefficient racing than those that occur at lower speed.

The increased use of automated digital systems in financial trading is causing competitive energy to be channeled into an unproductive latency race. Investments in speed may be disproportionately rewarded. At least two possibilities exist to remedy this issue, both of which derive from the same underlying insight. For example: at shorter time scales racing can be displaced by the use of a continuous lottery for temporal priority; and/or racing can be discouraged by an injection of temporal noise into the order flow.

A lottery may operate in a continuous trading environment as follows. Arriving orders may not be exposed to the market right away, but instead may be placed in a buffer or queue. This mechanism may be applied to all orders arriving at an exchange, to a separate pool, and/or to a particular class of tradable financial instruments. This queue may not be a first-in/first-out queue; instead, orders may be drawn out at random. In this sense it is more of a pool than a queue—call it a pooled queue, or PoolQ for short. The average waiting time may be very brief, but some orders may be kept waiting longer than others. In effect, when the timing of access to the trading floor is precious, it may be allocated by lottery.

FIG. 1 depicts an example PoolQ system. In FIG. 1, traders 110 may issue one or more transaction messages 130 containing one or more orders or order commitments to a financial market 120. Trader 110 may be a machine, such as a computer, or a person issuing transaction messages 130 to financial market 120. Trader 110 may transmit one or more transaction messages 130 in encrypted format or the order or order commitments may be encrypted. The order or order commitments may include an instruction to buy or sell at least one of: a financial instrument, an equity, a stock, a bond, a mutual fund, an option, a bank note, a security, debt, a contract, an exchanged traded fund, an index fund, a currency, an asset, a liability, a portfolio of assets, a commodity, a future, a derivative, and/or a hedge. In one embodiment, a select financial instrument, for example, may be offered only through financial market 120. However, the select financial instrument offered through financial market 120 may be otherwise identical to another different financial instrument traded at a separate financial exchange system. For example, financial market 120 may offer trading in a buffered ETF (exchange traded fund) that is identical to another ETF, except for the requirement that orders for the buffered ETF must be processed through a temporal buffer.

Financial market 120 may include an exchange, an off-exchange trading pool, and/or a venue that facilitates continuous financial trading. Financial market 120 may include one or more computers or computer systems capable of, for example, receiving, delaying, decrypting, opening, verifying, and executing orders or order commitments contained in transaction messages 130. Financial market 120 may contain one or more receiving process 140 (e.g., a receiving computer) operable to receive transaction messages 130 from traders 110. Financial market 120 may also contain queue 150 (e.g., a queue process, temporal buffer, etc.) designed to receive transaction messages 130 and impose, for example, a random delay on the transaction messages 130 or on the orders or order commitments before exposing orders or order commitments contained in transaction messages 130 to market 170. Financial market 120 may also include open order process 160 (e.g., an opening computer) operable to open transaction messages 130, after transaction messages 130 have been through queue 150, and to expose the orders or order commitments exposed to market 170. Market 170 may match open orders (e.g., a buy order with a sell order). Financial market 120 may transmit notification of executed orders 180 back to traders 110.

In one embodiment, different types of transaction messages 130 (e.g., orders and/or order commitments) may be subject to the same delay mechanism including, for example, cancellation orders. A "buy" order, for example, can be cancelled by entering an offsetting "sell" order, but the party placing the two orders may have no control over when, exactly, each order is processed, or which one will be processed first. Other embodiments may adopt a more relaxed version of this constraint. For example, a cancellation order, after being held in the PoolQ, might then execute immediately if the original order is still uncrossed or pending.

In another embodiment, by imposing random delays using queue 150 on incoming transaction messages 130 and/or orders or order commitments, the PoolQ mechanism may render racing at short time scales impractical. These random delays may be very short (e.g., less than one second, or greater than 100 nanoseconds and less than 10 minutes, etc.) and still have the effect of diminishing the opportunity and incentive to race. A brief delay may be of little consequence to noise traders and to most news traders. A brief delay, however, may discourage traders who are seeking to profit from "news-with-a-fuse"—information whose trading value is expected to vanish almost immediately because the information will be widely available almost immediately. In particular, a brief delay may discourage racing the tape.

Although a random delay may appear undesirable to traders 110, most traders 110 should appreciate the random delay because the random delay may facilitate the ability of traders 110 to trade with other traders 110 who also are willing to tolerate the delay. The PoolQ lottery may force market participants to bear some short-term timing risk, but this risk sharing may be beneficial because the short-term timing risk may be unavoidable anyway. Trading a security in a buffered market may produce higher returns than trading an otherwise identical security in an unbuffered, "real-time" market. Order buffering produces higher returns by avoiding the costs and risks associated with the very short-term transient information asymmetries that exist in the real-time market. Short-term racing may be seen to be a negative-sum game, and most traders 110 will likely be happy to avoid playing the negative-sum game. The PoolQ buffering mechanism may allow market makers, noise traders, and most news traders to trade with each other, and to separate themselves from news-with-a-fuse traders.

Because this solution discovered by the inventor may be advantageous to most traders, there may be no need to impose the solution by regulation. Buffered financial markets may exist side-by-side with real-time markets without difficulty. Arbitrage between these markets may keep these markets synchronized, with the caveat that arbitrageurs must follow the rules in each market the arbitrageurs trade in. Different markets may operate at different speeds, for example, the retail market for mutual funds, trading once per day, and the market for Exchange Traded Funds (ETFs), trading continuously. For an investor averse to racing, the limited ability to trade mutual funds may be considered a feature, and not a fault. But it does not create a problem to have a real-time ETF market running simultaneously, for those with a taste for a faster game.

In another embodiment, a distinct buffered security may exist. Financial market 120 may create a separate contract that may be traded only through a PoolQ. For example, a futures exchange may create a "b-mini" equity index contract that is mostly identical to an existing e-mini contract, except that the b-mini may only be traded through a buffer.

In another embodiment, an off-exchange trading pool may exist. A trading pool, or so-called "Dark Pool," may offer order buffering as a service to its customers. For example, orders arriving at the pool may be subject to a brief delay, order matching may be done internally, and only net positions may be traded externally. Note that a common practice among dark pools is to withhold or delay the availability of information about their order flow and trading. One distinctive feature of the PoolQ mechanism is that the PoolQ mechanism may delay the exposure of the order itself to the market, as opposed to merely delaying the availability of information about the order.

In another embodiment, an entire financial market 120 may adopt the PoolQ mechanism broadly to stabilize trading.

The PoolQ mechanism may be adjusted to accommodate varying market conditions as they develop, while maintaining continuous and orderly trading. For example, the average PoolQ delay may be set at a very small number, even zero, for normal market conditions. The average delay (e.g., size of the buffer) may be increased quickly—up to some predetermined limit—in response to sudden price movements, unusual trading volume, unusually one-sided order flow, unusually low liquidity, or other indicators of a turbulent market. This promises to be more effective and less disruptive than circuit breakers, which, instead of discouraging racing, can create new opportunities to engage in racing.

A physical buffer may not be necessary to implement the PoolQ mechanism. Instead, imposing randomly distributed short delays to the incoming order flow may be sufficient. In effect, the PoolQ mechanism may suppress racing by introducing a synthetic jitter—a random variability in the timing of a trade. In other contexts this may be called dithering. The digital processing of analog (e.g., continuous) data tends to introduce distracting artifacts at the higher frequencies; by adding high-frequency noise (often called "blue" noise, because blue is at the high-frequency end of the visible spectrum), these artifacts may be, if not removed, rendered invisible.

In one embodiment, the PoolQ mechanism may provide temporal dithering (e.g., high-frequency timing noise) to continuously trading financial markets 120. Just as it does with movies and video games, the use of temporal dithering may supply a fluidity of movement that may otherwise be difficult to achieve. Indeed, the very concept of continuity in a digital system is something of a challenge. This is not a problem as long as the digital processes are much faster than the processes they are controlling—megahertz and now gigahertz computers have no trouble providing the illusion of continuity to music we listen to on a kilohertz scale. Similarly, computers have no trouble suppressing vibration in much slower machine tools. However, when a continuous process being controlled by a computer has patterns that resonate in the same frequency range in which the computer operates, digital artifacts and instabilities may appear. Temporal noise may erase those.

Noise traders may have no particular preferences about which part of a second their order executes in; therefore they should have no trouble tolerating high-frequency temporal noise. Many news traders may not be troubled by high-frequency temporal noise, either; because the information they possess has a durability measured in seconds or longer. But there is a subset of news traders who will find high-frequency temporal noise intolerable. Those are the news-with-a-fuse (NWAF) traders, and the fact that they find high-frequency temporal noise intolerable is the very reason that the noise traders may find high-frequency temporal noise attractive. Temporal noise may allow the noise traders to separate themselves from the NWAF traders.

One advantage of dithering may be the opportunity to trade with others who are also dithering. Traders using dithering may prefer to trade with other traders using dithering. In effect, dithering creates a "demilitarized zone" wherein traders may trade with greater confidence that they are not operating at a speed disadvantage. Since a vulnerability exists if information about orders were to leak out to the real-time market, confidentiality of the PoolQ orders may be maintained (e.g., no one may trade on information about the PoolQ orders).

In one embodiment, while an order is delayed in a temporal buffer 150, the order may not be exposed to the market. There may be no need for anyone other than the order originator to know what the order contains—not even the operator of the exchange or pool. In effect, until the order is exposed, the order may not be an order but an order commitment. In one embodiment, the order's contents may be encrypted until the point when the order is exposed. In this sense the PoolQ may not only be dark, the PoolQ may be absolutely black, with no visibility inside or out.

In one embodiment, the PoolQ may be protected from a trader changing an order commitment at the time the order is decrypted. For example, a difference of a single bit may change a buy order into a sell, depending on what key is used to decrypt the order. For this reason, the encryption mechanism may allow the pool operator to confirm and verify that the order exposed to the market is the same order that was committed earlier.

In one embodiment, the PoolQ process may look like this: one message conveys an encrypted order commitment to the PoolQ, which assigns a random delay, after which a second message conveys a key that "opens" the order commitment and verifies the order's uniqueness. This two-step handshake process may allow the customer to ensure that the order commitment was kept confidential (encrypted blackness), and the pool operator to be sure that the mandatory delay was not compromised (encrypted blueness). The black and blue handshake signals that a trader may not be in the possession of news with a fuse. The black and blue handshake may be a signaling mechanism that creates the confidence for investors to trade with each other. NWAF traders may still prefer to trade in the real time market, and there is no reason to stop them from doing so. Over time, however the real time market may become a less attractive place to trade.

As learned from fishery regulations, a rent-dissipating mechanism may be suppressed only to have another rent-dissipating mechanism pop up elsewhere. Even if the PoolQ mechanism succeeds in suppressing HFT racing, how can we be sure that we are not just shifting the inefficiency somewhere else?

To answer this question, consider a competition for "market share" among different market-clearing mechanisms. Prices, races, queues, and lotteries all may compete simultaneously to clear a market. When the prizes get unusually large, for example, people will often get up early (racing) to get a good place in line (queuing) to buy (pricing) lottery tickets (lottery). Similarly, rush-hour traffic on a congested toll road may be simultaneously governed by a dynamic combination of prices, races, queues, and lotteries.

The PoolQ mechanism may allow an essentially costless lottery to occupy the high-frequency space in a financial exchange—the space where racing ordinarily would occur. The PoolQ mechanism may effectively block access to that space where information asymmetries are prevalent (or, more accurately, can be bought), and where trading is thereby inefficient. By shifting trading to lower frequencies, the PoolQ mechanism may allow the price mechanism to operate on a time scale where public information is more evenly distributed. The result is not just a symptomatic treatment; the PoolQ mechanism may be designed to cure the underlying market failure and thereby make trading more efficient.

Figure 2:
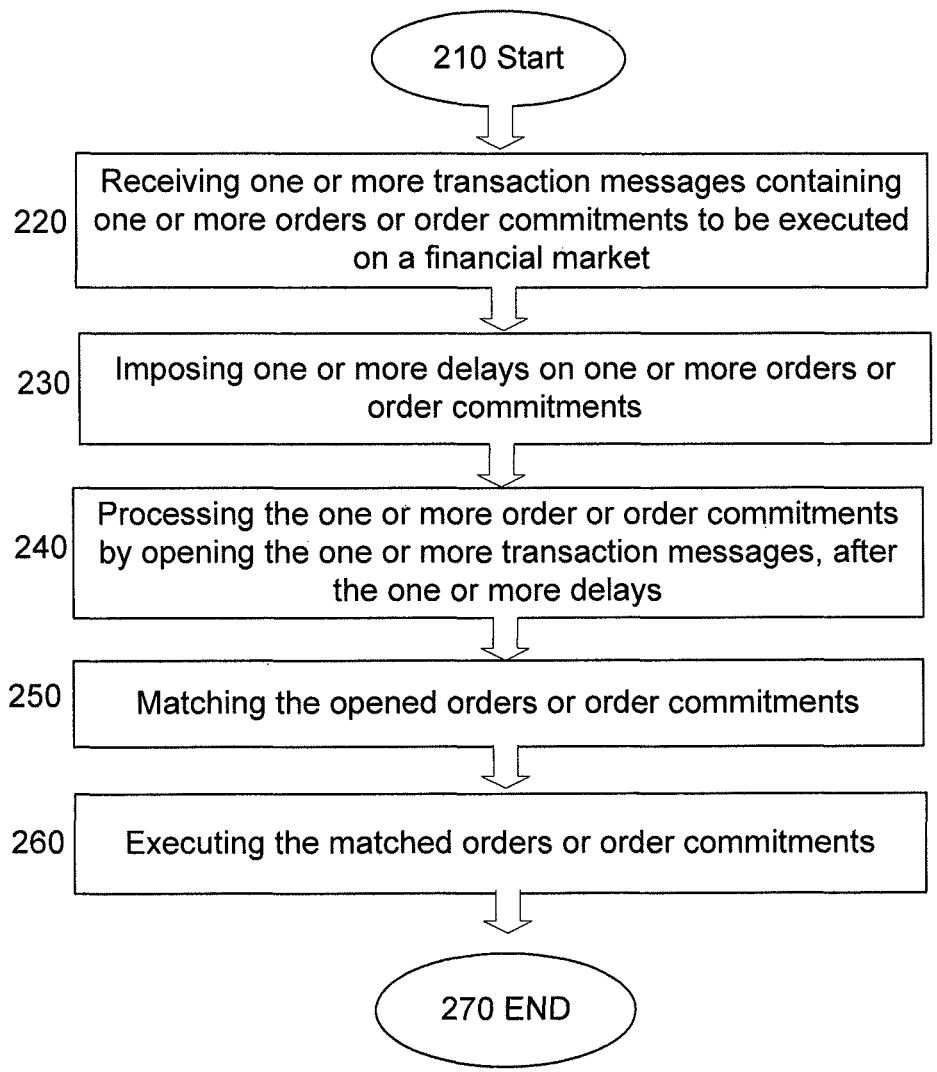
FIG. 2 depicts an illustrative workflow describing the operation of a financial market.

FIG. 2 depicts an illustrative workflow describing the operation of a financial market 120 by a computer system. In 210, flow may begin and proceed to 220. In 220, a financial market 120 may receive one or more transaction messages 130. Transaction messages 130 may include one or more orders or order commitments to be executed by the financial market 120. Transaction messages 130 may be received from traders 110. Transaction messages 130 and/or orders or order commitments may be received encrypted. The transaction messages 130 and/or orders or order commitments may be encrypted by traders 110 or transaction messages 130 and/or orders or order commitments may be initially encrypted by financial market 120 upon initial receipt. From 220, flow may proceed to 230.

In 230, one or more delays may be imposed on one or more transaction messages 130 and/or orders or order commitments. The one or more delays may use queue 150 and the delays may be calculated using a delay algorithm. The one or more delays may represent at least one of a random period of time and/or a randomly determined position in queue 150. The one or more delays may be adjusted in response to market observations such as sudden price movements, unusually high or low trading volume, one-sided order flow, low liquidity, or market volatility. From 230, flow may proceed to 240.

In 240, after the one or more delays imposed in 230, transaction messages 130 may be opened and one or more orders or order commitments contained in transaction messages 130 may be processed and/or exposed to the financial market. The transaction messages 130 may be opened using open order process 160. The one or more orders or order commitments may include a first set of one or more orders or order commitments and a second set of one or more order or order commitments. Transaction messages 130 and/or orders or order commitments may be decrypted after the one or more delays imposed in 230 and before opened. Either through encryption or other techniques, the contents and originators of transaction messages 130 and/or orders or order commitments may be kept confidential until transaction messages 130 are opened and/or processed. In an embodiment, verification of the one or more orders or order commitments may be performed to confirm the opened one or more orders or order commitments have not been altered and/or still reflect traders' 110 intent when sending the transaction messages 130. In an embodiment, the orders or order commitments may be protected from disclosure to a third party and/or other parties for the duration of the delay or longer. From 240, flow may proceed to 250.

In 250, the opened orders or order commitments may be matched (e.g., the first set of orders or order commitments and the second set of orders or order commitments may be matched (e.g., buy and sell orders are paired)). Orders or order commitments that have not been subjected to the one or more delays may be excluded from matching, wherein the matching exclusion includes at least one of: temporary matching exclusion, permanent matching exclusion, partial matching exclusion, and/or complete matching exclusion. From 250, flow may proceed to 260.

In 260, the matched orders or order commitments (e.g., buy and sell orders) may be executed. Execution of orders may occur by market 170. Notification of executed orders 180 may be transmitted to traders 110 and/or third parties. From 260, flow may proceed to 270, and flow may end.

While being developed, temporally buffered trading mechanisms, running alongside real-time markets, may give market participants a choice of how fast they want to trade. The racing hypothesis implies that slightly slower trading may appeal to many investors, and may produce superior returns. To the extent that wasteful racing is suppressed, confidence in financial markets may be restored. Temporal noise will cloak the higher frequencies and give buffered markets a more workable approximation of fluidity and continuity. The average investor should once again be able to take a random walk down Wall Street, without fear of stepping on the cracks.

Figure 3:
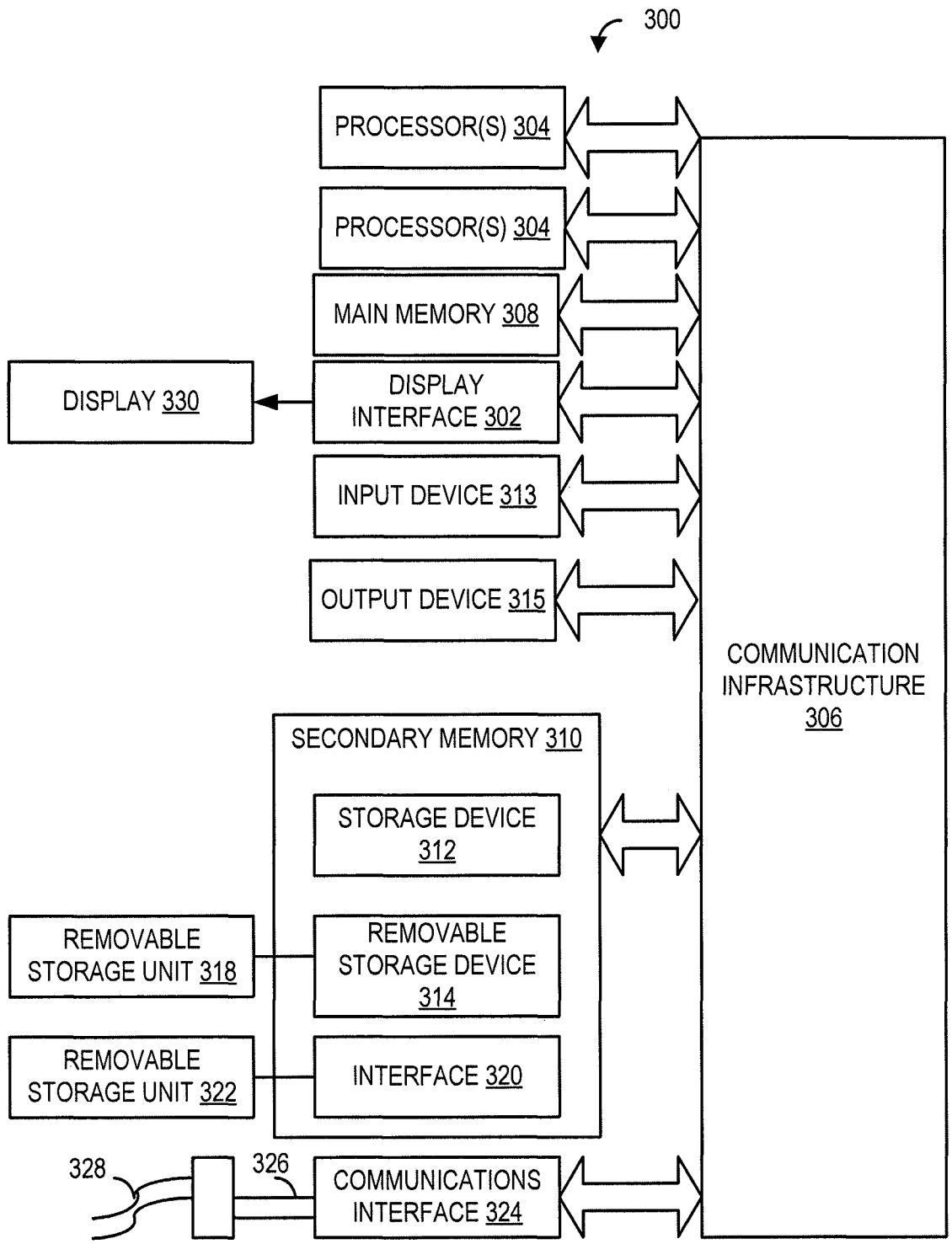
FIG. 3 depicts an illustrative computer system.

FIG. 3 depicts an illustrative computer system that may be used in implementing an illustrative embodiment of the embodiments described herein. Specifically, FIG. 3 depicts an illustrative embodiment of a computer system 300 that may be used in computing devices such as, e.g., but not limited to, standalone or client or server devices. FIG. 3 depicts an illustrative embodiment of a computer system that may be used as client device, or a server device, etc. The invention (or any part(s) or function(s) thereof) may be implemented using hardware, software, firmware, or a combination thereof and may be implemented in one or more computer systems or other processing systems. In an illustrative embodiment, the invention may be directed toward one or more computer systems capable of carrying out the functionality described herein. For example, traders 110 and financial market 120 may be implemented using one or more embodiments of computer system 300. Furthermore, components of financial market 120 such as receive process 140, queue 150, open order process 160, and market 170 may be implemented with one or more embodiments of computer system 300.

An example of a computer system 300 is shown in FIG. 3, depicting an illustrative embodiment of a block diagram of an illustrative computer system useful for implementing the invention. Specifically, FIG. 3 illustrates an example computer 300, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/etc. available from MICROSOFT® Corporation of Redmond, Wash., U.S.A. or an Apple computer executing MAC® OS from Apple® of Cupertine, Calif., U.S.A. However, the invention is not limited to these platforms. Instead, the invention may be implemented on any appropriate computer system running any appropriate operating system. In one illustrative embodiment, the invention may be implemented on a computer system operating as discussed herein. An illustrative computer system, computer 300 is shown in FIG. 3. Other components of the invention, such as, e.g., (but not limited to) a computing device, a communications device, a telephone, a personal digital assistant (PDA), an iPhone, an iPad, a 3/4G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 3. Computer system 300 may be connected to a network and/or interact with a networked cloud of computers.

The computer system 300 may include one or more processors, such as, e.g., but not limited to, processor(s) 304. The processor(s) 304 may be connected to a communication infrastructure 306 (e.g., but not limited to, a communications bus, cross-over bar, interconnect, or network, etc.). Processor 304 may include any type of processor, microprocessor and/or processing logic that may interpret and execute instructions (e.g., for example, a field programmable gate array (FPGA)). Processor 304 may comprise a single device (e.g., for example, a single core) and/or a group of devices (e.g., multi-core). The processor 304 may include logic configured to execute computer-executable instructions configured to implement one or more embodiments. The instructions may reside in main memory 308 or secondary memory 310. Processors 304 may also include multiple independent cores, such as a dual-core processor or a multi-core processor. Processors 304 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

Computer system 300 may include a display interface 302 that may forward, e.g., but not limited to, graphics, text, and other data, etc., from the communication infrastructure 306 (or from a frame buffer, etc., not shown) for display on the display unit 330. The display until 330 may be, for example, a television, a computer monitor, or a mobile phone screen. The output may also be provided as sound through a speaker.

The computer system 300 may also include, e.g., but is not limited to, a main memory 308, random access memory (RAM), and a secondary memory 310, etc. Main memory 308, random access memory (RAM), and a secondary memory 310, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 310 may include, for example, (but is not limited to) a hard disk drive 312 and/or a removable storage drive 314, representing a floppy diskette drive, a magnetic tape drive, an optical disk drive, a compact disk drive CD-ROM, flash memory, etc. The removable storage drive 314 may, e.g., but is not limited to, read from and/or write to a removable storage unit 318 in a well-known manner. Removable storage unit 318, also called a program storage device or a computer program product, may represent, e.g., but is not limited to, a floppy disk, magnetic tape, optical disk, compact disk, etc. which may be read from and written to removable storage drive 314. As will be appreciated, the removable storage unit 318 may include a computer usable storage medium having stored therein computer software and/or data.

In alternative illustrative embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 322 and interfaces 320, which may allow software and data to be transferred from the removable storage unit 322 to computer system 300.

As an example, the main memory 308 and/or the secondary memory 310 may store instructions for implementing the receive process 140, queue 150, open order process 160, and/or market 170.

Computer 300 may also include an input device 313 may include any mechanism or combination of mechanisms that may permit information to be input into computer system 300 from, e.g., a user. Input device 313 may include logic configured to receive information for computer system 300 from, e.g. a user. Examples of input device 313 may include, e.g., but not limited to, a mouse, pen-based pointing device, or other pointing device such as a digitizer, a touch sensitive display device, and/or a keyboard or other data entry device (none of which are labeled). Other input devices 313 may include, e.g., but not limited to, a biometric input device, a video source, an audio source, a microphone, a web cam, a video camera, and/or other camera. Input device 313 may communicate with processor 304 either wired or wirelessly.

Computer 300 may also include output devices 315 which may include any mechanism or combination of mechanisms that may output information from computer system 300. Output device 315 may include logic configured to output information from computer system 300. Embodiments of output device 315 may include, e.g., but not limited to, display 330, and display interface 302, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 300 may include input/output (I/O) devices such as, e.g., (but not limited to) communications interface 324, cable 328 and communications path 326, etc. These devices may include, e.g., but are not limited to, a network interface card, and/or modems. Output device 315 may communicate with processor 304 either wired or wirelessly.

Communications interface 324 may allow software and data to be transferred between computer system 300 and external devices. For example, communications interface 324 may allow financial market 120 to send and receive data to and from traders 110 and to and from other financial markets.

In this document, the terms "computer program medium" and "computer readable medium" may be used to generally refer to media such as, e.g., but not limited to, removable storage drive 314, a hard disk installed in hard disk drive 312, flash memories, removable discs, non-removable discs, etc. In addition, it should be noted that various electromagnetic radiation, such as wireless communication, electrical communication carried over an electrically conductive wire (e.g., but not limited to twisted pair, CATS, etc.) or an optical medium (e.g., but not limited to, optical fiber) and the like may be encoded to carry computer-executable instructions and/or computer data that embodiments of the invention on e.g., a communication network. These computer program products may provide software to computer system 300. It should be noted that a computer-readable medium that comprises computer-executable instructions for execution in one or more processors may be configured to store various embodiments of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application.

According to another embodiment, embodiments may be represented by any of a number of well-known network architecture designs including, but not limited to, peer-to-peer, client-server, hybrid-client (e.g., thin-client), or stand-alone.

While various embodiments of the invention have been described above, it should be understood that they have been presented by way of example only, and not limitation.

What is claimed is:

1. A method comprising:
   receiving, at a processor, a financial transaction message, the financial transaction message including an order or order commitment to be executed on a buffered financial market;
   imposing, by the processor, a random delay on the financial transaction message, including:
     generating a high-frequency timing noise; and
     providing temporal dithering to the financial transaction message based on the high-frequency timing noise to impose the random delay on the financial transaction message;
   opening, by the processor, the financial transaction message after the random delay imposed on the financial transaction message;
   after the random delay and opening the financial transaction message, matching, by the processor, the order or order commitment to one or more other opened orders or order commitments in the buffered financial market, wherein orders or order commitments that have not been subject to a delay based on a random delay algorithm are excluded from the matching, to generate matched orders; and
   executing, by the processor, the matched orders in the buffered financial market.

2. The method of claim 1, further comprising:
   decrypting the order or order commitment after the random delay, wherein the order or order commitment is received encrypted.

3. The method of claim 1, further comprising:
   protecting the order or order commitment from disclosure to a third party for a duration of the random delay.

4. The method of claim 1, wherein the random delay is calculated based on price movement, trading volume, order flow, liquidity, or market volatility.

5. The method of claim 1, further comprising:
   verifying that the order or order commitment has not been altered prior to execution.

6. The method of claim 1, wherein the order or order commitment comprises an instruction to buy or sell at least one of: an equity, a stock, a bond, a mutual fund, an option, a bank note, a security, debt, a contract, an exchanged traded fund, an index fund, a currency, an asset, a liability, a portfolio of assets, a commodity, a future, a derivative, or a hedge.

7. The method of claim 1, wherein the buffered financial market is at least one of: an exchange, an off-exchange trading pool, or a venue that facilitates continuous financial trading.

8. A financial exchange system, comprising:
   a storage device comprising a temporal buffer;
   an input device configured to receive a financial transaction message, wherein the financial transaction message includes an order or order commitment to buy or sell a financial instrument on a buffered financial market; and
   at least one processor configured to:
     insert the financial transaction message into the temporal buffer;
     impose a random delay on the financial transaction message, including:
       generating a high-frequency timing noise; and
       providing temporal dithering to the financial transaction message based on the high-frequency timing noise to impose the random delay on the financial transaction message;
     after the random delay, open the financial transaction message;
     after the random delay and opening the financial transaction message, match the order or order commitment to one or more other opened orders or order commitments in the buffered financial market, wherein orders or order commitments that have not been subject to a delay based on a random delay algorithm are excluded from matching, to generate matched orders; and
     execute the matched orders in the buffered financial market.

9. The financial exchange system of claim 8, wherein the financial instrument is offered only through the financial exchange system and is identical to a second financial instrument traded at a separate second financial exchange system.

10. The financial exchange system of claim 8, wherein the order or order commitment is received encrypted.

11. The financial exchange system of claim 8, wherein the at least one processor is further configured to:
    decrypt the order or order commitment after the random delay and prior to executing the order or order commitment.

12. The financial exchange system of claim 11, wherein the at least one processor is further configured to:
  verify, prior to executing a decrypted order or decrypted order commitment, that the order or order commitment has not been altered.

13. The financial exchange system of claim 8, wherein the buffered financial market is at least one of: an exchange, an off-exchange trading pool, or a venue that facilitates continuous financial trading.

14. The financial exchange system of claim 8, wherein a plurality of financial transaction messages are received by the financial exchange system and inserted into the temporal buffer, each financial transaction message including an order or order commitment to buy or sell the financial instrument.

15. A non-transitory computer-readable storage media having computer-executable instructions stored which, when executed by a computer system having at least one processor, cause the computer system to perform operations to:
  receive a financial transaction message, the financial transaction message including an order or order commitment to be executed on a buffered financial market;
  impose a random delay on the financial transaction message, including:
    generating a high-frequency timing noise; and
    providing temporal dithering to the financial transaction message based on the high-frequency timing noise to impose the random delay on the financial transaction message;
  open the financial transaction message after the random delay imposed on the financial transaction message;
  after the random delay and opening the financial transaction message, match the order or order commitment to one or more other opened orders or order commitments in the buffered financial market, wherein orders or order commitments that have not been subject to a delay based on a random delay algorithm are excluded from the matching, to generate matched orders; and
  execute the matched orders in the buffered financial market.

16. The non-transitory computer-readable storage media of claim 15, wherein the order or order commitment is received encrypted.

17. The non-transitory computer-readable storage media of claim 16 having additional instructions stored which, when executed by the computing system, cause the computing system to perform operations to:
  decrypt the order or order commitment after the random delay.

18. The non-transitory computer-readable storage media of claim 17 having additional instructions stored which, when executed by the computing system, cause the computing system to perform operations to:
  verify that the order or order commitment has not been altered prior to processing a decrypted order or decrypted order commitment to the buffered financial market for execution.

19. The non-transitory computer-readable storage media of claim 15, wherein:
  the buffered financial market is a single financial exchange,
  the financial transaction message is offered only through the buffered financial market, and the financial transaction message is identical to a second financial instrument traded at a separate second financial exchange.

20. The non-transitory computer-readable storage media of claim 15, wherein the buffered financial market is at least one of: an exchange, an off-exchange trading pool, or a venue that facilitates continuous financial trading.

* * * * *